(12) United States Patent
Cao et al.

(10) Patent No.: US 10,330,129 B2
(45) Date of Patent: Jun. 25, 2019

(54) HYDRAULIC CONTROL VALVE ASSEMBLY OF AUTOMATIC STEERING SYSTEM FOR AGRICULTURAL MACHINE

(71) Applicant: SHANGHAI HUACE NAVIGATION TECHNOLOGY LTD, Shanghai (CN)

(72) Inventors: Guangjie Cao, Shanghai (CN); Yanping Zhao, Shanghai (CN); Wending Dai, Shanghai (CN); Anbang Wang, Shanghai (CN); Xiaohan Gao, Shanghai (CN); Xunye Mao, Shanghai (CN); Kai Chen, Shanghai (CN)

(73) Assignee: SHANGHAI HUACE NAVIGATION TECHNOLOGY LTD, Shanghai (CN)

( * ) Notice: Subject to any disclaimer, the term of this patent is extended or adjusted under 35 U.S.C. 154(b) by 154 days.

(21) Appl. No.: 15/543,571

(22) PCT Filed: Jul. 4, 2016

(86) PCT No.: PCT/CN2016/088315
§ 371 (c)(1),
(2) Date: Jul. 13, 2017

(87) PCT Pub. No.: WO2017/080230
PCT Pub. Date: May 18, 2017

(65) Prior Publication Data
US 2017/0370383 A1   Dec. 28, 2017

(30) Foreign Application Priority Data

Nov. 13, 2015 (CN) .......................... 2015 1 0777223

(51) Int. Cl.
*B62D 5/06* (2006.01)
*F15B 13/04* (2006.01)
(Continued)

(52) U.S. Cl.
CPC ........ *F15B 13/0401* (2013.01); *A01B 69/008* (2013.01); *B62D 5/06* (2013.01);
(Continued)

(58) Field of Classification Search
CPC ........ F15B 13/0401; F15B 1/26; F15B 11/08; F15B 13/028; F15B 2211/50; A01B 69/008; B62D 5/06; B62D 5/062
See application file for complete search history.

(56) References Cited

U.S. PATENT DOCUMENTS 7,726,438 B2 * 6/2010 Beck .................. B62D 3/14
180/432
8,046,122 B1 * 10/2011 Barta .................. B63H 25/30
60/382

(Continued)

FOREIGN PATENT DOCUMENTS

CN      103010069 A  *  4/2013  ............... B60P 1/48
CN      103522929 A     1/2014
(Continued)

*Primary Examiner* — Joseph M Rocca
*Assistant Examiner* — Michael R Stabley
(74) *Attorney, Agent, or Firm* — Gokalp Bayramoglu

(57) ABSTRACT

Disclosed is a hydraulic control valve assembly of automatic steering system for agricultural machine including a proportional directional valve (3). A balancing valve (1) is arranged between the proportional directional valve (3) and the steering cylinder. A first shuttle valve (2) is arranged between the proportional directional valve (3) and the balancing valve (1). The first shuttle valve (2) is positioned on one side of the proportional directional valve (3). An overflow valve (4) is positioned on another side of the proportional directional valve (3). The overflow valve (4) is connected to a second shuttle valve (6) and a logic valve (5) respectively. The hydraulic control valve assembly has a large control power, a rapid response, and is more suitable for the autonomous navigation operation of agricultural machine. Moreover, the (Continued)

system saves more energy, such that the autonomous navigation operation of agricultural machine is more stable.

6 Claims, 1 Drawing Sheet

(51) Int. Cl.
*A01B 69/04* (2006.01)
*F15B 1/26* (2006.01)
*F15B 11/08* (2006.01)
*F15B 13/02* (2006.01)
*F16K 15/02* (2006.01)

(52) U.S. Cl.
CPC ............... *B62D 5/062* (2013.01); *F15B 1/26* (2013.01); *F15B 11/08* (2013.01); *F15B 13/028* (2013.01); *F15B 2211/305* (2013.01); *F15B 2211/50* (2013.01); *F16K 15/025* (2013.01)

(56) References Cited

U.S. PATENT DOCUMENTS

| | | | |
|---|---|---|---|
| 9,867,325 B2 * | 1/2018 | Clifford | A01D 41/12 180/167 |
| 2014/0311814 A1 * | 10/2014 | Morselli | B62D 1/22 180/167 |
| 2015/0305225 A1 | 10/2015 | Clifford et al. | |
| 2016/0290367 A1 * | 10/2016 | Lillemets | B62D 5/064 180/167 |
| 2018/0319634 A1 * | 11/2018 | Shan | B66C 13/20 180/167 |

FOREIGN PATENT DOCUMENTS

| | | |
|---|---|---|
| CN | 103663296 A | 3/2014 |
| CN | 105298971 A | 2/2016 |
| JP | 2010076647 A | 4/2010 |

* cited by examiner

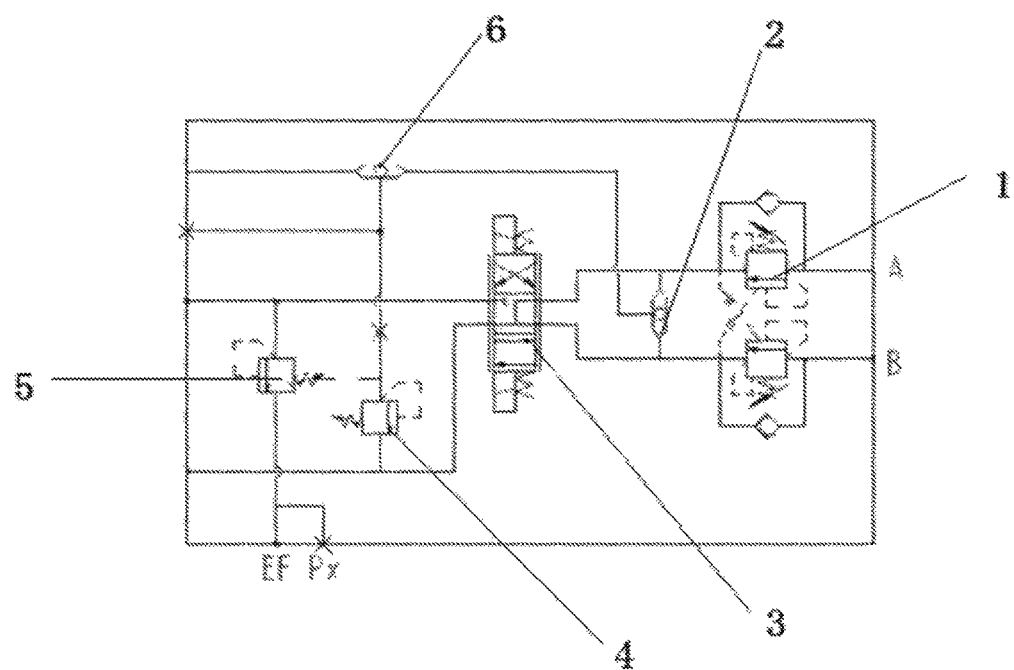

HYDRAULIC CONTROL VALVE ASSEMBLY OF AUTOMATIC STEERING SYSTEM FOR AGRICULTURAL MACHINE

CROSS REFERENCE TO RELATED APPLICATIONS

This application is the national phase entry of International Application No. PCT/CN2016/088315, filed on Jul. 4, 2016, which is based upon and claims priority to Chinese Patent Application No. 201510777223.3 filed on Nov. 13, 2015, the entire contents of which are incorporated herein by reference.

TECHNICAL FIELD

The present invention relates to the field of hydraulic technology, specifically to hydraulic control valve assembly of automatic steering system in the intelligent navigation of agricultural machine.

BACKGROUND

The autonomous navigation technology for agricultural machine is profoundly studied by the developed countries, and the products are also widely applied in practice. However, the research of autonomous navigation technology in China is still backward, and the practical use is even worse. To speed up the agricultural modernization, some researches have been conducted on the electro-hydraulic servo based feedback system and the full-hydraulic steering gear driven by the stepper motor. However, the researches are mainly focused on the research achievements of universities, which is far from the being used in practice.

The automatic steering technology is one of the key technologies for intelligentizing the agricultural machine. Under severe conditions of the production environment, steering control of agricultural machine in agriculture industry is significantly different with that of the vehicle traveling on a common road. The agricultural machine works in an environment with unpredictable terrain and rugged pavement with various hardness. Thus, the steering control device of agricultural machine in agriculture industry needs to adapt different states of the vehicle and take a proper strategy according to different working conditions, such that a generally agile and accurate control is required. Therefore, development and research of the most economical and practical automatic steering control device of agricultural machine play an important role in achieving precision agriculture.

SUMMARY OF THE INVENTION

With regard to the existing drawbacks of the autonomous navigation operation of agricultural machine in the prior art mentioned above, the present invention provides a hydraulic control valve assembly of automatic steering system for agricultural machine which can make the autonomous navigation operation of agricultural machine more stable.

The technical solution of the present invention is as below. A hydraulic control valve assembly of automatic steering system for agricultural machine is provided. The agricultural machine includes a steering cylinder, a steering pump, and an oil return tank. The steering pump is connected to the steering cylinder and the oil return tank respectively. The present invention is characterized in that the hydraulic control valve assembly includes a proportional directional valve. A balancing valve is arranged between the proportional directional valve and the steering cylinder. A first shuttle valve is arranged between the proportional directional valve and the balancing valve. The first shuttle valve is positioned on one side of the proportional directional valve. An overflow valve is positioned on another side of the proportional directional valve. The overflow valve is connected to a second shuttle valve and a logic valve respectively.

In the hydraulic control valve assembly described above, the balancing valve includes two one-way valves, and the two one-way valves are connected to each other in parallel.

In the hydraulic control valve assembly described above, each one-way valve is provided with a compression spring. The compression spring is configured to prevent the hydraulic oil from reversely flowing through the one-way valve.

In the hydraulic control valve assembly, the proportional directional valve is connected to an A opening and a B opening, and the A opening and the B opening are both connected to an oil cylinder.

In the hydraulic control valve assembly, the logic valve is configured to control the pressure of the system and the pressure difference which exists when the proportional valve is working.

In the hydraulic control valve assembly, the open pressure of the compression spring is 1.3 times as large as the steering aligning force.

In the hydraulic control valve assembly, the open pressure of the compression spring is 40 bar.

In the hydraulic control valve assembly, the control ratio of the balancing valve is 4.5.

The hydraulic control valve assembly of automatic steering system for agricultural machine is provided by the present invention, wherein the hydraulic control valve assembly includes a proportional directional valve. A balancing valve is arranged between the proportional directional valve and the steering cylinder. A first shuttle valve is arranged between the proportional directional valve and the balancing valve. The first shuttle valve is positioned on one side of the proportional directional valve. An overflow valve is positioned on another side of the proportional directional valve. The overflow valve is connected to a second shuttle valve and a logic valve respectively. The hydraulic control valve assembly provided by the present invention has a large control power, a rapid response, and is more suitable for the autonomous navigation operation of agricultural machine. Moreover, the design of the load sensor ensures that the steering speed is only related to the control signal but not to the load. The system saves more energy. More specifically, with the valve assembly of the present invention, the original manual steering is altered into an electric power automatic steering. Combined with the detection signal of the external sensor, a closed-loop real-time operation is conducted via a controller, thereby improving the response and control accuracies of the system, such that the error is less. The hydraulic control valve assembly of the present invention is provided with a Y-type functional three-position four-way hydraulic proportional directional valve for controlling the direction and speed of the steering. The logic valve performs the function of energy saving and preference discrimination. The overflow valve is used for safety protection. The balancing valve can make the steering more stable.

BRIEF DESCRIPTION OF THE DRAWINGS

Through the detailed description of the non-limiting embodiments with reference to the following drawings, the present invention, the features, the profile, and the advantages thereof will become more apparent. Throughout the drawings, the same number refers to the same part. The drawings are not intentionally drawn according to the scale, whereas the key point is to illustrate the principles of the present invention.

FIG. 1 is a schematic diagram of the principle of the hydraulic control valve assembly of automatic steering system for agricultural machine provided by the present invention.

DETAILED DESCRIPTION OF THE INVENTION

In the following description, a lot of specific details are set forth for a thorough understanding of the present invention. However, it is obvious to those skilled in the art that the present invention could be implemented in absence of one or more of such details. In other instances, in order to avoid confusion of the present invention, technical features known in the art are not described.

For a thorough understanding of the present invention, detailed steps and detailed structure are set forth in the following description to illustrate the technical solution of the present invention. The preferred embodiments of the present invention are described in details as below. However, except for the following detailed description, the present invention may have other embodiments.

With reference to FIG. 1, a hydraulic control valve assembly of automatic steering system for agricultural machine is provided by the present invention, wherein the hydraulic control valve assembly includes proportional directional valve 3. Balancing valve 1 is arranged between proportional directional valve 3 and the steering cylinder. First shuttle valve 2 is arranged between proportional directional valve 3 and balancing valve 1. First shuttle valve 2 is positioned on one side of proportional directional valve 3. Overflow valve 4 is positioned on another side of proportional directional valve 3. Overflow valve 4 is connected to second shuttle valve 6 and logic valve 5 respectively. In the present invention, the hydraulic oil of agricultural machine can go forward through balancing valve 1. If flowing reversely, the hydraulic oil needs to overcome the open pressure set by the spring of balancing valve 1. A backpressure is imposed on the returning oil, such that the steering is more stable. Also, a phenomenon of useless suction caused by the external load can be avoided. With the hydraulic control valve assembly of the present invention, the original manual steering is altered into an electric power automatic steering. Combined with the detection signal of the external sensor, a closed-loop real-time operation is conducted via a controller, thereby improving the response and control accuracies of the system, such that the error is less. The hydraulic control valve assembly of the present invention is provided with Y-type functional three-position four-way hydraulic proportional directional valve 3 for controlling the direction and speed of the steering. Logic valve 5 performs the functions of energy saving and preference discrimination. Overflow valve 4 is used for safety protection. Balancing valve 1 can make the steering more stable. Further combined with the navigation system of agricultural machine, the present invention can make the autonomous navigation operation of agricultural machine more stable.

In a preferred but non-limiting embodiment of the present invention, balancing valve 1 includes two one-way valves. The two one-way valves are connected to each other in parallel. That is to say, the hydraulic oil can go forward through the balancing valve from the one-way valve without restrictions. However, if flowing reversely, the hydraulic oil needs to overcome the open pressure set by the spring of balancing valve. Thus, a backpressure is imposed on the returning oil, such that the steering is more stable and a phenomenon of useless suction caused by the external load can be avoided. More preferably, the one-way valve is provided with a compression spring. The compression spring is configured to prevent the hydraulic oil from reversely flowing through the one-way valve.

In a preferred but non-limiting embodiment of the present invention, as shown in FIG. 1, the proportional directional valve is connected to an A opening and a B opening, and the A opening and the B opening are both connected to an oil cylinder. Since the oil port connected to the steering pump would not open when the pressure is less than the open pressure set by the balancing valve, oil cannot return to the steering cylinder. The steering cylinder would not work until the pressure is greater than the pressure set by balancing valve 1. When the balancing valve 1 opens, the steering cylinder starts to work. Because the pressure is greater than the aligning pressure generated by the wheel. Thus, the steering is more stable.

In a preferred but non-limiting embodiment of the present invention, logic valve 5 is used for controlling the pressure of system and the pressure difference of the proportional valve during working, wherein the spring compression of logic valve 5 is selected to be 7 bars. When the electric power steering is working, the pressure of system is always and only 7 bars greater than the pressure of load. When the electric power steering is not working, the load is unloaded by the pressure of only 7 bars, such that the generated heat is greatly reduced. Additionally, logic valve 5 ensures the pressure difference to be about 7 bars when proportional directional valve 3 is working, such that proportional directional valve 3 is not affected by the load. Therefore, it is ensured that the steering speed only relates to the given PWM signal but not to the load.

In a preferred but non-limiting embodiment of the present invention, the open pressure of the compression spring is 1.3 times as large as the steering aligning force. Furthermore, the open pressure of the compression spring is 40 bar. When the open pressure of the compression spring is 40 bar, the control ratio of the balancing valve 1 is 4.5 preferably.

An embodiment is provided as below to further illustrate the present invention.

Embodiment 1, with reference to FIG. 1, a hydraulic control valve assembly of automatic steering system for agricultural machine is provided by the present invention. The present invention installs a hydraulic control valve assembly in the steering oil lines of the original agricultural machine in parallel to drive the steering oil cylinder. The original manual steering is altered into an electric power automatic steering. Combined with the detection signal of the external sensor, a closed-loop real-time operation is conducted via a controller, thereby improving the response and control accuracies of the system, such that the error is smaller. The present invention is provided with Y-type functional three-position four-way hydraulic proportional directional valve 3 for controlling the direction and speed of the steering. Logic valve 5 performs the function of energy saving and preference discrimination. Overflow valve 4 is used for safety protection. Balancing valve 1 can make the steering more stable. The specific process is as below. The hydraulic oil can go forward through balancing valve 1 from the one-way valve without restrictions. However, if flowing reversely, the hydraulic oil needs to overcome the open pressure set by the spring of balancing valve. Thus, a backpressure is imposed on the oil return, such that the steering is more stable and a phenomenon of useless suction caused by the external load can be avoided. Usually, the open pressure of balancing valve 1 is 1.3 times as large as the steering aligning force. According to the characteristics of the agricultural machine, the open pressure of balancing valve 1 is usually set to be around 40 bars, and the control ratio of balancing valve 1 is selected to be 4.5. When the proportional valve is reversed, one of the A opening and B opening of the valve is connected to the steering pump, and of the other is connected to the oil return tank. Since the oil port connected to the steering pump would not open when the pressure is less than the open pressure set by the balancing valve, oil cannot return to the steering cylinder. The steering cylinder would not work until the pressure is greater than the pressure of 40 bars set by the balancing valve. When the balancing valve opens, the steering cylinder starts to work. Because the pressure is greater than the aligning pressure generated by the wheel. Thus, the steering is more stable.

The spring compression of logic valve 5 is selected to be 7 bars. When the electric power steering is working, the pressure of the system is always and only 7 bars greater than the pressure of load. When the electric power steering is not working, the load is unloaded by the pressure of only 7 bars, such that the generated heat is greatly reduced. Additionally, the logic valve ensures the pressure difference to be about 7 bars when proportional valve is working, such that the proportional valve is not affected by the load. Therefore, it is ensured that the steering speed only relates to the given PWM signal but not to the load. Further combined with the navigation system of agricultural machine, the present invention can make the autonomous navigation operation of agricultural machine more stable.

In conclusion, a hydraulic control valve assembly of automatic steering system for agricultural machine is provided by the present invention, wherein the hydraulic control valve assembly includes a proportional directional valve. A balancing valve is arranged between the proportional directional valve and the steering cylinder. A first shuttle valve is arranged between the proportional directional valve and the balancing valve. The first shuttle valve is positioned on one side of the proportional directional valve. An overflow valve is positioned on another side of the proportional directional valve. The overflow valve is connected to a second shuttle valve and a logic valve respectively. The hydraulic control valve assembly provided by the present invention has a large control power, a rapid response, and is more suitable for the autonomous navigation operation of agricultural machine. Moreover, the design of the load sensor ensures that the steering speed is only related to the control signal but not to the load. The system saves more energy. More specifically, with the valve assembly of the present invention, the original manual steering is altered into an electric power automatic steering. Combined with the detection signal of the external sensor, a closed-loop real-time operation is conducted via a controller, thereby improving the response and control accuracies of the system, such that the error is less. The hydraulic control valve assembly of the present invention is provided with a Y-type functional three-position four-way hydraulic proportional directional valve for controlling the direction and speed of the steering. The logic valve performs the functions of energy saving and preference discrimination. The overflow valve is used for safety protection. The balancing valve can make the steering more stable.

The preferred embodiments of the invention are described above. It should be understood that the present invention is not limited to the specific embodiments described above. The devices and structures that are not described in detail should be understood and implemented in a conventional manner in the art. With the methods and techniques disclosed above, those skilled in the art can make many possible variations and modifications to the technical solution or derive equivalent embodiments of equivalent variations of the present invention without departing from the scope of the technical solution of the present invention. Such amendments do not affect the substantive content of the present invention. Thus, any simple modification, equivalent variations and alternation to the above embodiments according to the technical essence of the present invention without departing from the technical scheme of the invention fall within the protection scope of the technical solution of the present invention.

What is claimed is:

1. A hydraulic control valve assembly of an automatic steering system for an agricultural machine comprising:
   a proportional directional valve;
   a balancing valve, arranged between the proportional directional valve and a steering cylinder;
   a first shuttle valve, arranged between the proportional directional valve and the balancing valve;
   wherein the first shuttle valve is positioned on one side of the proportional directional valve; and
   an overflow valve, positioned on another side of the proportional directional valve; wherein the overflow valve is connected to a second shuttle valve and a logic valve respectively,
   wherein the agricultural machine comprising,
   the steering cylinder;
   a steering pump; and
   an oil return tank;
   further wherein the steering pump is connected to the steering cylinder and the oil return tank respectively, and
   wherein the balancing valve includes two one-way valves; and
   the two one-way valves are connected to each other in parallel.

2. The hydraulic control valve assembly of the automatic steering system for the agricultural machine according to claim 1, wherein,
   each one-way valve is provided with a compression spring; and
   the compression spring is configured to prevent hydraulic oil from reversely flowing through the one-way valve.

3. The hydraulic control valve assembly of the automatic steering system for the agricultural machine according to claim 2, wherein,
   an open pressure of the compression spring is 1.3 times as large as a steering aligning pressure.

4. The hydraulic control valve assembly of the automatic steering system for the agricultural machine according to claim 3, wherein,
   the open pressure of the compression spring is 40 bars.

5. The hydraulic control valve assembly of the automatic steering system for the agricultural machine according to claim 1, wherein,
   the proportional directional valve is connected to an A opening and a B opening; and
   the A opening and the B opening are both connected to an oil cylinder.

6. The hydraulic control valve assembly of the automatic steering system for the agricultural machine according to claim 1, wherein, the logic valve is configured to control a pressure of the system and a pressure difference of the proportional valve during working.

\* \* \* \* \*